(12) United States Patent
Su et al.

(10) Patent No.: US 11,387,659 B2
(45) Date of Patent: Jul. 12, 2022

(54) SWITCHING MODE CHARGER WITH PASS THROUGH MODE

(71) Applicant: TEXAS INSTRUMENTS INCORPORATED, Dallas, TX (US)

(72) Inventors: Yipeng Su, Allen, TX (US); Qiong M. Li, Allen, TX (US); Jing Ye, Dallas, TX (US); Siew Kuok Hoon, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 311 days.

(21) Appl. No.: 16/452,175

(22) Filed: Jun. 25, 2019

(65) Prior Publication Data
US 2019/0393702 A1 Dec. 26, 2019

Related U.S. Application Data

(60) Provisional application No. 62/690,020, filed on Jun. 26, 2018.

(51) Int. Cl.
*H02J 7/00* (2006.01)
*H02M 3/156* (2006.01)

(52) U.S. Cl.
CPC .......... *H02J 7/00043* (2020.01); *H02J 7/008* (2013.01); *H02J 7/0068* (2013.01); *H02M 3/156* (2013.01)

(58) Field of Classification Search
USPC .......................................... 320/140
See application file for complete search history.

(56) References Cited

U.S. PATENT DOCUMENTS

| | | | | |
|---|---|---|---|---|
| 2010/0207455 A1* | 8/2010 | Erickson, Jr. | ....... | H02M 3/1582 307/82 |
| 2015/0069958 A1* | 3/2015 | Yang | ....... | H02J 7/007 320/107 |
| 2016/0105110 A1* | 4/2016 | Houston | ....... | H02M 3/1582 323/271 |
| 2018/0129234 A1* | 5/2018 | Melgar | ....... | G05F 1/563 |

* cited by examiner

*Primary Examiner* — Samuel Berhanu
(74) *Attorney, Agent, or Firm* — Mark A. Valetti; Charles A. Brill; Frank D. Cimino

(57) ABSTRACT

Aspects of the present disclosure provide for a method. In at least some examples, the method includes controlling gate terminals of one or more transistors of a charger to operate the charger in a buck-boost mode of operation to generate a system voltage based on a bus voltage by performing power conversion through switching, determining that the bus voltage is greater in value than a voltage of a battery coupled to the charger, and controlling the gate terminals of the one or more transistors of the charger to operate the charger in a pass-through mode of operation to generate the system voltage based on the bus voltage without performing power conversion.

7 Claims, 5 Drawing Sheets

```
//***************************************************************
//
// EN_PTM
//
always_comb enIf.ptmW = dgIf.hiZPTMPinSetSync &&
    hostRegs_i.mem31.ptmPinSelect && hostRegs_i.mem30.enPTM;
//
// EN_PTM_OOA
//
always_comb enIf.ptmOOAW = hostRegs_i.mem01.en_ptm_ooa &&
    otpData_i.bits.otp_en_ptm_ooa;
//
// PTM_ACT
//
// ECO to turn off PTM_ACT when IDPM_ACT is high
always_comb enIf.ptmActW = enIf.ptm && dgIf.ptmDg &&
    ~dgIf.vBusHiOrVSysHiDg && ~dgIf.iDpmActive500usDg;
//
// PTM_BLOCK_SYS_OVP
//
// Turn this signal on with EN_PTM and keep on until the
// falling edge of ptmDg (another 210ms-285ms)
//
always_comb enIf.ptmBlockSysOvpW = enIf.ptmW || dgIf.ptmDg;
//***************************************************************
```

FIG. 5

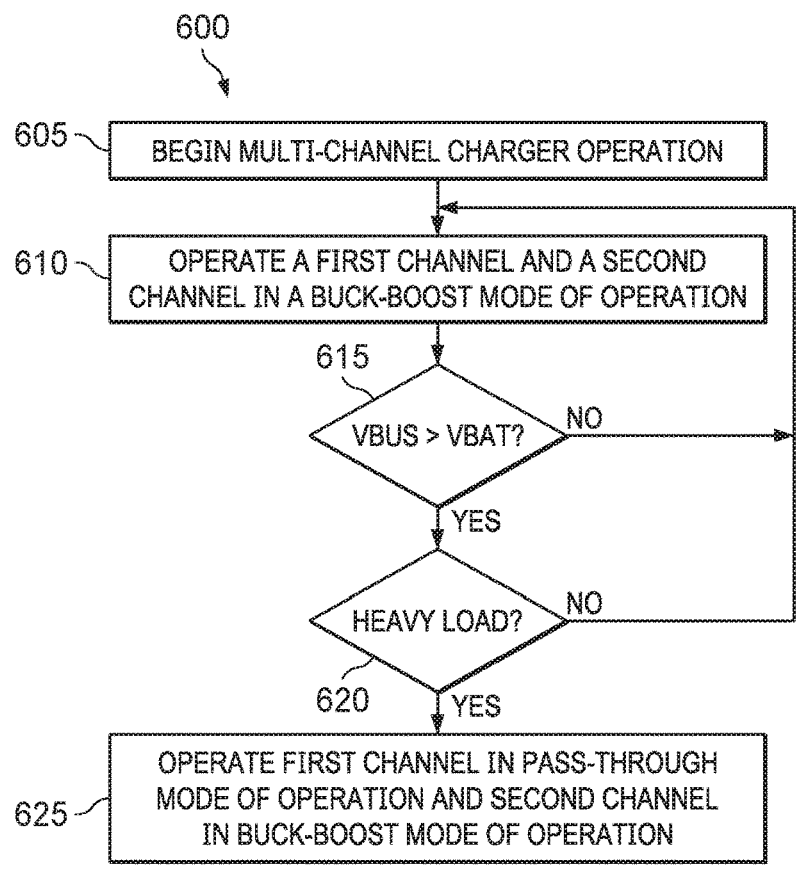

FIG. 6

SWITCHING MODE CHARGER WITH PASS THROUGH MODE

CROSS-REFERENCE TO RELATED APPLICATIONS

The present application claims priority to U.S. Provisional Patent Application No. 62/690,020, which was filed Jun. 26, 2018, is titled "Switching Mode Charger with Pass Through Mode for Dynamic and Intelligent Power Management," and is hereby incorporated herein by reference in its entirety.

BACKGROUND

A charger is a circuit implemented for controlling charging of a battery in a system. At least some chargers further control delivery of power to sub-systems, circuits, components, etc. of the system (e.g., a system load, or more simply a load, from the perspective of the charger). Chargers are available in various configurations, each of which may have certain advantages and disadvantages such that trade-offs often occur in obtaining one desired advantageous characteristic at the cost of another, disadvantageous characteristic also existing.

SUMMARY

Aspects of the present disclosure provide for a circuit. In at least some examples, the circuit includes a first transistor, an inductor, a second transistor, and a controller. The first transistor has a drain terminal coupled to a first node, a source terminal coupled to a second node, and a gate terminal. The second transistor has a source terminal coupled to a third node, a drain terminal coupled to a fourth node, and a gate terminal. The controller is coupled to the gate terminal of the first transistor and the gate terminal of the second transistor. The controller is configured to control the first transistor and the second transistor to operate as components of a pass-through path in the circuit under first operational circumstances, the pass through path including the inductor and electrically coupling the first node to the fourth node and control the first transistor and the second transistor to operate as components of a buck-boost power converter under second operational circumstances to generate a system voltage present at the fourth node based on the bus voltage, the system voltage having a different value as a result of the switching of the first transistor or the second transistor than a value of the bus voltage.

Other aspects of the present disclosure provide for a system. In at least some examples, the system includes a power adapter, a load, a battery, and a first charger. The power adapter is configured to receive a bus voltage. The load is coupled to a first node. The battery has a terminal coupled to a second node. The first charger is coupled to the power adapter, the first node, and the second node to provide a system voltage to the first node. The first charger configured to couple the power adapter to the first node via a pass-through path during a pass-through mode of operation when the bus voltage is greater in value than a voltage of the battery, couple the power adapter to the first node and the second node via a buck-boost path during a buck-boost mode of operation when the bus voltage is not greater in value than the voltage of the battery, and perform a soft start when transitioning between the pass-through mode of operation and the buck-boost mode of operation by controlling switching of components of the first charger when operating in the buck-boost mode of operation.

Other aspects of the present disclosure provide for a method. In at least some examples, the method includes controlling gate terminals of one or more transistors of a charger to operate the charger in a buck-boost mode of operation to generate a system voltage based on a bus voltage by performing power conversion through switching, determining that the bus voltage is greater in value than a voltage of a battery coupled to the charger, and controlling the gate terminals of the one or more transistors of the charger to operate the charger in a pass-through mode of operation to generate the system voltage based on the bus voltage without performing power conversion.

Other aspects of the present disclosure provide for a circuit. In at least some examples, the circuit includes a controller that includes a logic circuit. The controller is configured to couple to a gate terminal of a first transistor and couple to a gate terminal of a second transistor. The controller is further configured to control, via the logic circuit implementing a state machine, the first transistor and the second transistor to operate as components of a pass-through path in the circuit under first operational circumstances, the pass through path providing a received bus voltage to a load as a system voltage without performing power switching. The controller is further configured to control, via the logic circuit implementing the state machine, the first transistor and the second transistor to operate as components of a buck-boost power converter under second operational circumstances to generate the system voltage based on the bus voltage, the system voltage having a different value than a value of the bus voltage as a result of performing power switching via the first transistor or the second transistor under control of the logic circuit implementing the state machine.

BRIEF DESCRIPTION OF THE DRAWINGS

For a detailed description of various examples, reference will now be made to the accompanying drawings in which:

FIG. 5 shows a table of executable code for implementing a state machine;

FIG. 6 shows a flowchart of an illustrative method in accordance with various examples.

DETAILED DESCRIPTION

Figure 1:
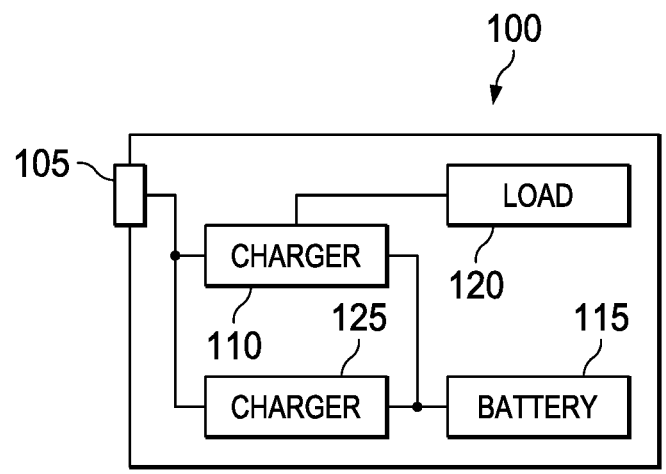
FIG. 1 shows a block diagram of an illustrative system in accordance with various examples.

A hybrid power boost (HPB) charger is a charger in which a signal received at a power adapter coupled to the charger is provided directly to the load for powering the system. In this context, "directly" means passing through any number of components located in a path between the power adapter and the load but not being converted in value via a converter such as a buck converter, boost converter, etc. The signal received at the power adapter is then provided to a battery, through a buck power converter, for charging the battery. The HPB charger has a benefit of high efficiency (e.g., by way of limited power loss due to heat or switching losses) due to the lack of power conversion in a path between the power adapter and the load, particularly in high-power applications. For example, at least some implementations of the HPB charger are preferred over other charger technologies when an output of the charger (combined system power and battery charging power) is approximately 90 watts (W) or higher in power. In such examples, the HPB charger is approximately 90-95 percent efficient, losing, in some examples, approximately 5-9 W of power to losses associated with the HPB charger. However, the HPB charger suffers from a potential detriment in that the input signal received at the power adapter must have a higher voltage than a voltage of the battery to prevent a leakage current from flowing from the battery to the load. Thus, the HPB charger is highly efficient, but for a limited input voltage range. A narrow-voltage direct current (NVDC) charger is a charger in which the signal received at the power adapter is provided to the load and to the battery through a power converter (e.g., such as a buck-boost power converter, hybrid buck-boost power converter, etc.) to the load for powering the system and the battery for charging. The NVDC charger has a benefit of wide input voltage range (e.g., accepting an input signal having a voltage higher and/or lower than the voltage of the battery). However, the NVDC charger suffers from a potential detriment in that supporting the wide input voltage range causes the NVDC charger to have higher losses, and generate more heat, than at least some other chargers such as the HPB charger. For example, to support the wide input voltage range, the NVDC charger includes circuitry configured to perform voltage conversion (e.g., buck and/or boost) in the path between the power adapter and the load. This circuitry generates heat and has certain switching losses (e.g., such as about 4-5 W greater losses than the HPB charger over the same range of operation as the HPB charger), increasing the overall losses of the NVDC charger when compared to other charger architectures. The losses due to heat are particularly heightened for high power input signals, where the heat can, in some examples, damage and/or destroy a component of the NVDC charger.

At least some aspects of the present disclosure provide for a circuit. The circuit is, in some example a charger. For example, at least some implementations of the circuit are implemented as a switching mode charger. The circuit, in some implementations, includes a pass-through mode and a buck-boost mode. Including both the pass-through mode and the buck-boost mode in the circuit, in at least some examples, gives the circuit certain advantages when compared to other chargers. For example, for an input signal having a voltage greater than the voltage of the battery, the circuit operates in the pass-through mode, shorting the power adapter to the load through one or more components, but without performing power conversion (e.g., neither buck nor boost) between the power adapter and the load. When the input signal has a voltage less than the voltage of the battery, the circuit operates in the buck-boost mode, power conversion (e.g., increasing a voltage value, such as via a boost converter) between the power adapter and the load. In this way, the singular chip provides advantages of both the high-power tolerance and high-efficiency of a pass-through mode of operation, similar to an HPB, while also supporting a wide range of input voltages, similar to an NVDC.

In at least some examples, the circuit is dual-mode such that it provides a single chip that performs in an optimized manner for both high power input signals having a voltage greater than the voltage of the battery and for input signals having a voltage less than the voltage of the battery. The single chip consumes less physical space (e.g., surface area, silicon die area, etc.) than implementing separate chargers each optimized for input signals having certain parameters (e.g., such as the HPB charger and the NVDC charger, discussed above) and is therefore a reduced cost implementation of supporting both high power and wide ranging input signals. In this way, the circuit includes benefits of both the HPB charger and the NVDC charger, while negating, minimizing, or otherwise at least partially mitigating at least some detrimental characteristics of the HPB charger and/or the NVDC charger.

In at least some examples, the circuit includes a charger controller as well as one or more other active and/or passive components. The other active and/or passive components, in various examples, include transistors, inductors, resistors, capacitors, diodes, etc. At least some of the other active and/or passive components form a pass-through path and a buck-boost path. In some examples, one or more of the other active and/or passive components are included in both the pass-through path and the buck-boost path. For example, high-side transistors and an inductor of the buck-boost path may also be included in the pass-through path to form a path between a power adapter and a load with no power conversion and minimized losses. In other examples, the pass-through path and the buck-boost path include mutually exclusive components, but are both housed within the same chip (e.g., at least partially disposed on the same silicon die).

The charger controller controls at least some components of the circuit (e.g., such as transistors) to provide a desired operation of the circuit. For example, when an input signal is received at a power adapter (e.g., input node of the circuit) having a voltage greater than a voltage of a battery coupled to the charger controller, the charger controller controls one or more of the other components of the circuit to operate in the pass-through mode, conducting current to form a conductive path between the power adapter and a load coupled to the charger controller without performing power conversion. The load is, in some examples, one or more components of a system that includes the circuit and receives power from the power adapter and/or the battery, via the circuit and subject to control of the charger controller. When the input signal has a voltage less than the voltage of the battery, or equal to the voltage of the battery, the charger controller controls the one or more of the other components to operate in the buck-boost mode, forming a conductive path between the power adapter and the load through one or more paths that include power conversion.

In at least some examples, as the voltage of the input signal fluctuates the charger controller controls the one or more of the other components to dynamically transition between the pass-through mode and the buck-boost mode as dictated by the voltage of the input signal and/or the voltage of the battery. The transition is, in some examples, controlled by the charger controller to be a smooth transition. For example, when the charger controller is regulating a signal provided to the load to have a voltage that is less than the voltage of the input signal (e.g., such as a regulated voltage of about 5 volts (V) and an input signal voltage of about 20 V), directly transitioning from the buck-boost mode to the pass-through mode can create an undesirable effect on the load and/or in the charger controller, such as a large value inrush current resulting from the shorting together of two different voltages. Similarly, when the signal provided to the load has a voltage that is greater than a voltage to which the charger controller will begin regulating the signal and the signal directly transitions from the pass-through mode to the buck-boost mode, a glitch or other undesirable effect on the load can occur. To prevent this undesirable effect, the charger controller implements a smooth transition in both directions between the pass-through mode and the buck-boost mode.

For example, when entering the pass-through mode from the buck-boost mode the charger controller controls the one or more of the other components to progressively over-regulate the signal provided to the load about a specified voltage level (e.g., such as the 5 V mentioned above), slowly increasing the regulation point until the signal provided to the load has a voltage approximately equal to, or at a minimum, more near to, the voltage of the signal being received at the power adapter and that will be provided to the load in the pass-through mode. At this time, the charger controller controls the one or more of the other components to exit the buck-boost mode and enter the pass-through mode. Similarly, when exiting the pass-through mode and entering the buck-boost mode the charger controller controls the one or more of the other components to begin regulating the signal provided to the load at a regulation point approximately equal to the voltage of the battery before progressively decreasing the regulation point until it reaches the specified level.

Turning now to FIG. 1, a block diagram of an illustrative system 100 is shown. In at least some examples, the system 100 is representative of an electronic device. The electronic device may be a consumer electronic device, a commercial electronic device, a wearable device, etc. For example, in at least some implementations the electronic device is any one of a laptop computer (including notebooks, netbooks, thin-client devices, or other forms of battery-powered computing devices having a physical keyboard), a tablet device (e.g., including battery-powered computing devices having a touchscreen and/or virtual keyboard), a smartphone, a smart watch, a power tool, and/or any other device including both a battery and a terminal for receiving mains power, or power derived from mains power (e.g., such as via an adapter, transformer, etc.), for powering the device and/or charging the battery.

In at least one example, the system 100 includes a power adapter 105, a charger 110, a battery 115, and a load 120. Optionally, in some examples, the system 100 further includes a charger 125. While the system 100 is shown as optionally having two chargers (charger 110 and charger 125), in various examples the system 100 may include any number of chargers as determined by a desired functionality of the system 100. The adapter 105 is, in some examples, a physical port or terminal at which the system 100 is configured to receive power, such as from a mains power supply, a transformer, a battery, or any other suitable source. The charger 110, in at least some examples, is a dual-mode charger that couples the power adapter to the battery 115 and/or the load 120. When the system 100 also includes the charger 125, in some examples, the charger 110 couples the power adapter 105 to the load 120 and the charger 125 couples the power adapter 105 to the battery 115. The battery 115 is, in some examples, a multi-cell battery. In other examples, the battery 115 is a single-cell battery. The load 120 is any one or more circuits, sub-circuits, components, etc. of the system 100 that receive power via the charger 110 and/or the charger 125 from the power adapter 105 and/or the battery 115 for operation of the load 120. In the context of a power tool, the load 120 can include a motor, motor driver, and/or other associated components. In the context of a computing device, the load 120 can include a processor, memory, storage, input/output devices, a display component, a driver, and/or other associated components.

In an example of operation, the charger 110 controls the providing of power from the power adapter 105 to the load 120. In examples in which the charger 125 is not present in the system 100, the charger 110 also controls the providing of power from the power adapter 105 to the battery 115 and from the battery 115 to the load 120 and/or the power adapter 105. In examples in which the charger 125 is present in the system 100, the charger 110 and/or the charger 125 control(s) the providing of power from the power adapter 105 to the battery 115 and the charger 110 controls the providing of power from the battery 115 to the load 120. For example, in a high-efficiency mode of operation, the charger 125 controls the providing of power from the power adapter 105 to the battery 115 and in a fast charging mode of operation both the charger 110 and the charger 125 control the providing of power to the battery 115 in parallel, approximately doubling a charge current (and therefore reducing a charge time) of the battery 115. Unless otherwise stated, description herein proceeds under the assumption that the charger 125 is not present in the system 100, but when the charger 125 is present in the system 100, the charger 125 has substantially a same functional capability as the charger 110.

A bus voltage signal (VBUS) is received at the power adapter 105 and a system voltage signal (VSYS) is provided to the load 120. The battery has a voltage of VBAT. The charger 110, in at least some examples, is capable of operating in a plurality of modes. The modes include, at least, a pass-through mode and a buck-boost mode. When VBUS is greater in value than VBAT (e.g., by 100 millivolts (mV), 200 mV, 300 mV, or some other value in a millivolt range less than 1 V), the charger 110 operates in the pass-through mode and provides VBUS as VSYS with minimized loss. For example, the charger controls one or more switching components (e.g., such as transistors) to turn on and remain in a conductive state such that VBUS is provided as VSYS, where the value of VSYS is approximately equal to VBUS minus forward conduction losses associated with components in a critical path between the power adapter 105 and the load 120. In at least some examples, these losses do not include switching losses and no power conversion is performed along the critical path between the power adapter 105 and the load 120 when the charger 110 is operating in the pass-through mode. In this way, the pass-through mode provides increased efficiency over other modes of operation when VBUS is a high power and/or high voltage signal (e.g., such as having a voltage of about 20 V) at least due to the lack of switching losses, and therefore heat generation, along the critical path between the power adapter 105 and the load 120 when the charger 110 is operating in the pass-through mode.

When VBUS is not greater than VBAT, or is approximately equal to VBAT, the charger 110 operates in the buck-boost mode. In at least some examples, one or more components of the charger 110 are shared in common between the pass-through mode and the buck-boost mode. In the buck-boost mode, the charger 110 operates as a traditional buck-boost power converter, performing power conversion along the critical path between the power adapter 105 and the load 120 to increase (e.g., boost) or decrease (e.g., buck) VBUS to generate VSYS. In this way, the buck-boost mode provides for a wider range of suitable values of VBUS when compared to other modes of operation, not limiting the charger 110 to only operating when VBUS exceeds VBAT.

In various examples, the charger 110 further includes protections against one or more fault conditions, where the protections cause the charger 110, in some instances, to alter a mode of operation of the charger 110 based on the existence of the one or more fault conditions. Further, in at least some examples, the charger 110 facilitates charging of the battery 115, including both standard charging of the battery and quick or flash charging of the battery 115, as well as supplementing VSYS with VBAT.

Figure 2:
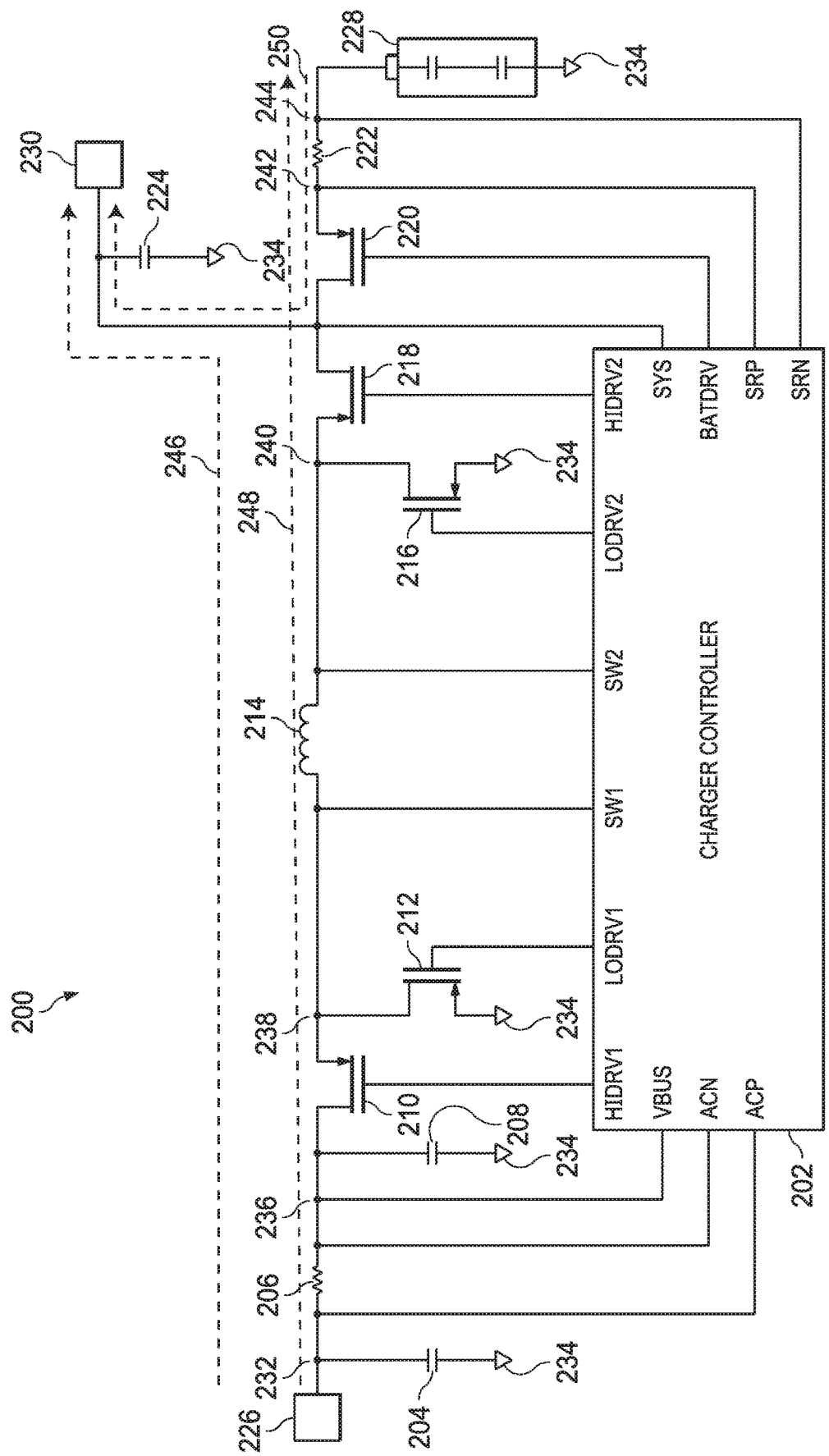
FIG. 2 shows a schematic diagram of an illustrative circuit in accordance with various examples.

Turning now to FIG. 2, a schematic diagram of an illustrative circuit 200 is shown. In at least some examples, the circuit 200 is suitable for implementation as the charger 110 and/or the charger 125 of the system 100 of FIG. 1. The circuit 200, in some examples, includes a charger controller 202, a capacitor 204, a resistor 206, a capacitor 208, a transistor 210, a transistor 212, an inductor 214, a transistor 216, a transistor 218, a transistor 220, a resistor 222, and a capacitor 224. In various examples, the circuit 200 further include, or is configured to couple to, a power adapter 226. Additionally, the circuit 200 further includes, or is configured to couple to, a battery 228. In at least some examples, the circuit 200 is configured to couple to a system that receives power at least partially via the circuit 200 at a node 230. The system is viewed by the circuit 200 as a load of the circuit 200 such that the circuit provides VSYS to the node 230 for at least partially powering the system. While described as being included in the circuit 200, in at least some examples any one or more of the foregoing components may instead not be included in the circuit 200 (e.g., not in a same chip, on a same silicon die, etc.), but rather be configured to couple to the circuit 200 (e.g., at a pin, a pad, or other coupling point exposed on a silicon die or chip). Additionally, in various examples one or more of the foregoing components may be omitted from the circuit 200 (e.g., such as omitting the capacitor 204, the resistor 206, the capacitor 208, the resistor 222, and/or the capacitor 224).

In an example architecture of the circuit 200, the power adapter 226 is coupled to a node 232. The capacitor 204 is coupled between the node 232 and a ground node 234. The resistor 206 is coupled between the node 232 and a node 236. The capacitor 208 is coupled between the node 236 and the ground node 234. The transistor 210 has a drain terminal coupled to the node 236, a source terminal coupled to a node 238, and a gate terminal. The transistor 212 has a drain terminal coupled to the node 238, a source terminal coupled to the ground node 234, and a gate terminal. The inductor 214 is coupled between the node 238 and a node 240. The transistor 216 has a drain terminal coupled to the node 240, a source terminal coupled to the ground node 234, and a gate terminal. The transistor 218 has a source terminal coupled to the node 240, a drain terminal coupled to the node 230, and a gate terminal. The transistor 220 has a drain terminal coupled to the node 230, a source terminal coupled to a node 242, and a gate terminal. The resistor 222 is coupled between the node 242 and a node 244. The capacitor is coupled between the node 230 and the ground node 234. The battery 228 is configured to couple to the circuit 200 at the node 244. The charger controller 202 has a plurality of inputs and a plurality of outputs. While certain inputs are described herein, the charger controller 202 may have fewer, or additional, inputs. For example, the charger controller 202 has an adapter-side positive input (ACP) coupled to the node 232, an adapter-side negative input (ACN) coupled to the node 236, a VBUS input coupled to the node 236, a switch input (SW1) coupled to the node 238, a switch input (SW2) coupled to the node 240, a system input (SYS) coupled to the node 230, a battery-side positive input (SRP) coupled to the node 242, and a battery-side negative input (SRN) coupled to the node 244. Additionally, the charger controller 202 has an output (HIDRV1) coupled to the gate terminal of the transistor 210, an output (LODRV1) coupled to the gate terminal of the transistor 212, an output (LODRV2) coupled to the gate terminal of the transistor 216, an output (HIDRV2) coupled to the gate terminal of the transistor 218, and an output (BATDRV) coupled to the gate terminal of the transistor 220. In examples of the circuit 200 in which fewer, or additional, controllable components such as transistors are included, the charger controller 202 may correspondingly have fewer, or additional, outputs for controlling each of the controllable components.

In an example of operation of the circuit 200, the charger controller 202 controls the transistor 210, transistor 212, transistor 216, transistor 218, and transistor 220 to control providing of VSYS to the node 230 via one of a pass-through path or a buck-boost path, as well as charging of the battery 228 and/or providing of power from the battery 228 to the node 230. For example, based on one or more of the inputs received by the charger controller 202 (e.g., corresponding to determined values of signals present at respective nodes to which the charger controller 202 is coupled), the charger controller 202 determines whether to operate in a pass-through mode that utilizes the pass-through path or a buck-boost mode that utilizes a buck-boost path. For example, a value of VBUS, received at the power adapter 226 and passed to the node 236 through the resistor 206 may range, in some examples, from about 3 V to about 24 V. In other examples, VBUS may have a value less than 3 V and/or greater than 24 V. The battery, in turn, has a voltage of VBAT. When VBUS is greater in value than VBAT, the circuit 200 can provide VBUS to the node 230 as VSYS (minus any losses associated with components along a critical path from the power adapter 226 to the node 230) without performing power conversion. In at least some examples, providing VBUS to the node 230 as VSYS without performing power conversion is performed in the pass-through mode and has advantages over alternative approaches, such as performing power conversion, as discussed above. These advantages include increased efficiency by not losing energy to heat and/or through switching losses of components involved in the power conversion.

To provide VBUS to the node 230 as VSYS, the charger controller 202 controls the transistor 210 and the transistor 218 to turn on, conducting between their respective source and drain terminals. The charger controller 202 further controls the transistor 212, the transistor 216, and the transistor 220 (in non-charging circumstances) to turn, or remain, off, preventing each of the transistor 212, the transistor 216, and the transistor 220 from conducting between the respective source and drain terminals. When the circuit 200 is also charging the battery 228, the transistor 220 is, in some examples, controlled by the charger controller 202 to turn on and conduct between its source and drain terminals. When the charger controller 202 controls the transistor 210 and the transistor 218 to turn on, with a remainder of transistors shown in the circuit 200 to be off, a critical path is formed from the power adapter 226, passing through the resistor 206, transistor 210, inductor 214, and transistor 218 to the node 230. This critical path is, in some examples, referred to as a pass-through path. When operating in the pass-through mode, the transistor 210 and the transistor 218 are each held on (e.g., maintained in a saturation region of operation) and, once fully energized, the inductor 214 approximates a mere wire (with some non-zero conduction loss) coupling the node 238 and the node 240 together. Accordingly, when operating in the pass-through mode, losses associated with providing power from the power adapter 226 to the node 230 are minimized. For example, along the pass-through path, losses are limited to those associated with the resistor 206, conduction losses associated with the transistor 210 and the transistor 218, and any losses that may be associated with the inductor 214. Notably, switching losses do not occur when operating in the pass-through mode because the transistor 210 and the transistor 218 are not repeatedly switching on and off (e.g., as they will when operating in the buck-boost mode). For at least this reason, the pass-through mode is suitable for use when VBUS is a high-power signal, such as having a value that would result in large energy losses due to switching losses, and resulting in the generation of significant heat, in the absence of operation in the pass-through mode.

In at least some examples, operation in the pass-through mode is only available to the circuit 200 when VBUS is greater than VBAT. For example, when VBUS is not greater than VBAT conduction between the node 242 and the node 230 may occur through a body diode (not shown) of the transistor 220, undesirably discharging the battery 228 to the node 230.

When VBUS is not greater in value than VBAT, the charger controller 202 controls the transistor 210, transistor 212, inductor 214, transistor 216, and transistor 218 to operate as a buck-boost converter, creating a buck-boost path, generating VSYS having a value approximately equal to a specified regulation point by performing power conversion on VBUS. As discussed above, in some examples at least some components (e.g., the transistor 210, the inductor 214, and the transistor 218) of the buck-boost path are shared in common with the pass-through path. The specified regulation point is, in various examples, received as a value by the charger controller 202 from an outside component to which the charger controller 202 is coupled or determined by the charger controller 202 according to one or more components (not shown) of the charger controller 202. In at least some examples, the regulation point is approximately equal to VBAT, for example, as measured by the charger controller 202 at the node 244. When operating in the buck-boost mode, in at least some examples, energy losses of the circuit 200 are greater than when operating in the pass-through mode. For example, when operating in the buck-boost mode, energy losses in the circuit 200 result from switching losses of each of the transistor 210, transistor 212, inductor 214, transistor 216, and transistor 218, conduction losses of each of the transistor 210, transistor 212, inductor 214, transistor 216, and transistor 218, and conduction losses of the resistor 206 and inductor 214. In some examples, these increased losses make the buck-boost mode less efficient than the pass-through mode, but increase an acceptable voltage range for VBUS, increasing applicable usage environments for the circuit 200.

In some examples, directly transitioning between the pass-through mode and the buck-boost mode may have undesirable effects on a component coupled to the node 230 and/or one or more components of the circuit 200. For example, transitioning directly from the buck-boost mode to the pass-through mode and causing VSYS to substantially instantaneously increase in value to the value of VBUS (e.g., by shorting the node 236 to the node 230) may cause an inrush current to flow through the circuit 200 from the power adapter 226 to the node 230. The inrush current, in some examples, causes undesirable operation and/or damage to a component coupled to the node 230, or one or more components of the circuit 200. To mitigate the inrush current, and one or more other potentially undesirable effects of substantially instantaneous transitions between the pass-through mode and the buck-boost mode, the charger controller 202 implements a soft start method of transitioning from the buck-boost mode to the pass-through mode and vice versa. For example, when the charger controller 202 determines that VBUS is greater in value than VBAT and determines to transition from the buck-boost mode to the pass-through mode, the charger controller 202 first controls the transistor 220 to turn off, ending charging of the battery 228, if the transistor 220 was previously turned on and the battery 228 was charging.

To implement the soft start, the charger controller 202 controls operation in the buck-boost mode to increase or decrease the value of VSYS prior to fully transitioning between the buck-boost mode and the pass-through mode. For example, when operating in the buck-boost mode and transitioning to the pass-through mode in which VSYS will be increased to VBUS, the charger controller 202 controls the transistor 210, transistor 212, inductor 214, transistor 216, and transistor 218 to increase a value of VSYS to approximately equal to VBUS prior to entering the pass-through mode. The increase in value is affected by a boost function of the buck-boost mode of operation of the circuit 200. In at least some examples, increasing the value of VSYS to approximately equal to VBUS prior to entering the pass-through mode from the buck-boost mode at least partially prevents or mitigates the inrush current, discussed above, flowing to the node 230 from the power adapter 226.

Similarly, when operating in the pass-through mode and transitioning to the buck-boost mode in which VSYS will decrease from approximately VBUS to approximately a value of VBAT, the charger controller 202 controls the transistor 210, transistor 212, inductor 214, transistor 216, and transistor 218 to decrease the value of VSYS from VBUS to the regulation point, discussed above, in a progressive, controlled manner as opposed to directly transitioning from VBUS in the pass-through mode to the regulation point in buck-boost mode. For example, based on a control loop (not shown) of the charger controller 202, the transistor 210, transistor 212, inductor 214, transistor 216, and transistor 218 are controlled to not provide power conversion (e.g., switching) until the node 230 has discharged, causing VSYS to decrease to approximately the regulation point.

Various protections are implemented by the charger controller 202 while operating in both the pass-through mode and the buck-boost mode. For example, the charger controller 202 monitors the circuit 200 to determine a value of VBUS (e.g., an input voltage), an input current (IIN), VSYS, current flowing through the node 230, current of the transistor 210, transistor 212, inductor 214, transistor 216, transistor 218, and/or transistor 220, VBAT, a current flowing through the node 244 to, or from, the battery 228, temperature, etc. Based on this monitoring, the charger controller 202 can detect, and in some circumstances act on, various fault conditions. These fault conditions include, for example, over current, under current, over voltage, and/or under voltage faults and/or an over temperature fault. While operating in the pass-through mode, in at least some examples, the charger controller 202 controls the circuit 200 to exit the pass-through mode to the buck-boost mode when a fault occurs. This mode change protects any one or more of a system coupled to the node 230, the battery 228, the circuit 200, and/or a power supply coupled to the power adapter 226 from damage resulting from continued operation in the pass-through mode in the presence of the fault condition. If a fault condition also occurs while operating in the buck-boost mode, in at least some examples the charger controller 202 stops switching power to protect any one or more of a system coupled to the node 230, the battery 228, the circuit 200, and/or a power supply coupled to the power adapter 226 from damage resulting from continued operation in the buck-boost mode in the presence of the fault condition. In at least some examples, at least some components (not shown) of the charger controller 202 that perform monitoring and/or fault protection for the circuit 200 during operation in the buck-boost mode also perform monitoring and/or fault protection for the circuit 200 during operation in the pass-through mode. In other examples, one or more additional components (not shown) at least partially provide monitoring and/or fault protection for the circuit 200 during operation in the pass-through mode. In some examples, these additional components are located within the charger controller 202, while in other examples these additional components are coupled to the charger controller 202. For example, in at least some implementations a first comparator (such as a Vin dynamic power management (VinDPM) comparator) monitors a value of VBUS with respect to a threshold VinDPM and a second comparator (such as an IIN dynamic power management (IinDPM) comparator) monitors a value of IIN with respect to another threshold IinDPM. When VBUS is less than VinDPM, the charger controller 202 controls the circuit 200 to exit the pass-through mode to the buck-boost mode. Similarly, when IIN is greater than IinDPM for a predefined period of time (e.g., such as for 500 microsecond or longer), the charger controller 202 controls the circuit 200 to exit the pass-through mode to the buck-boost mode and regulates IIN to approximately 0.65*IinDPM. In this example, VSYS begins to fall and, if necessary (e.g., such as when VSYS falls below VBAT), the charger controller 202 controls the transistor 220 to turn on to supplement VBUS in generating VSYS.

In further examples of operation of the circuit 200, the battery 228 is charged while VSYS is provided at the node 230. In yet other examples, the battery 228 is charged without regard to providing VSYS at the node 230 (e.g., such as when the circuit 200 is implemented in a dual-channel or dual-charger implementation, such as discussed above with respect to the charger 110 and the charger 125 of the system 100 of FIG. 1). For example, when an instance of the circuit 200 is implemented as the charger 110 and another instance of the circuit 200 is implemented as the charger 125 and both are operating in a fast charging scheme, current flows to the battery along the path 248 for both the charger 110 and the charger 125, with power being provided to the load 120 by the charger 110 via the path 246. When an instance of the circuit 200 is implemented as the charger 110 and another instance of the circuit 200 is implemented as the charger 125 and both are operating in a normal charging scheme (high-efficiency), current flows to the battery along the path 248 for the charger 125 and the charger 110 provides power to the load 120 via the path 246. In yet other examples, when the circuit 200 operates in a turbo mode, power is provided from the battery 234 to the node 230 via the path 250 while the circuit 200 transitions from pass-through mode to buck-boost mode. In some examples, the circuit 200 is operating in the buck-boost mode when the battery 228 is charging. However, in other examples, such as when VBUS has a value substantially near (e.g., approximately equal to) VBAT, the circuit 200 operates in the pass-through mode while charging the battery 228. In some examples, this is referred to as flash charging or quick charging. Flash charging, in some examples, refers to a charging scheme in which VBUS is fine-tuned to be very close in value to VBAT and is provided without power conversion to the battery 228 for charging the battery 228 in a rapid and highly-efficient manner via the path 248. When performing flash charging, a difference in voltage between VBUS and VBAT (e.g., VBUS minus VBAT), divided by an impedance between the power adapter 226 and the battery 228 is the charging current of the battery 228. When VBUS and VBAT have values substantially near in value to each other such that VBUS-VBAT divided by the above impedance can satisfy a fast charging current requirement, flash charging is performed. Through flash charging, VBUS is received at the power adapter 226 having a value determined by a programmable power supply (e.g., such as a Universal Serial Bus (USB) Power Delivery (PD) Programmable Power Supply (PPS)) to maintain the value of VBUS substantially near the value of VBAT, facilitating the flash charging.

In at least some examples, circuit 200 provides advantages over other solutions for flash charging in facilitating pre-charging operations, the fast charging, and charging termination operations via the singular circuit 200 as opposed to having a master charger that supplies VSYS and performs pre-charging operations and charging termination operations and a slave charger that performs the fast-charging only. This master charger and slave charger architecture, in some examples, underutilizes the slave charger and results in increased cost through added silicon die surface area and component count for implementing both the master charger and the slave charger as opposed to the circuit 200, disclosed herein.

Figure 3:
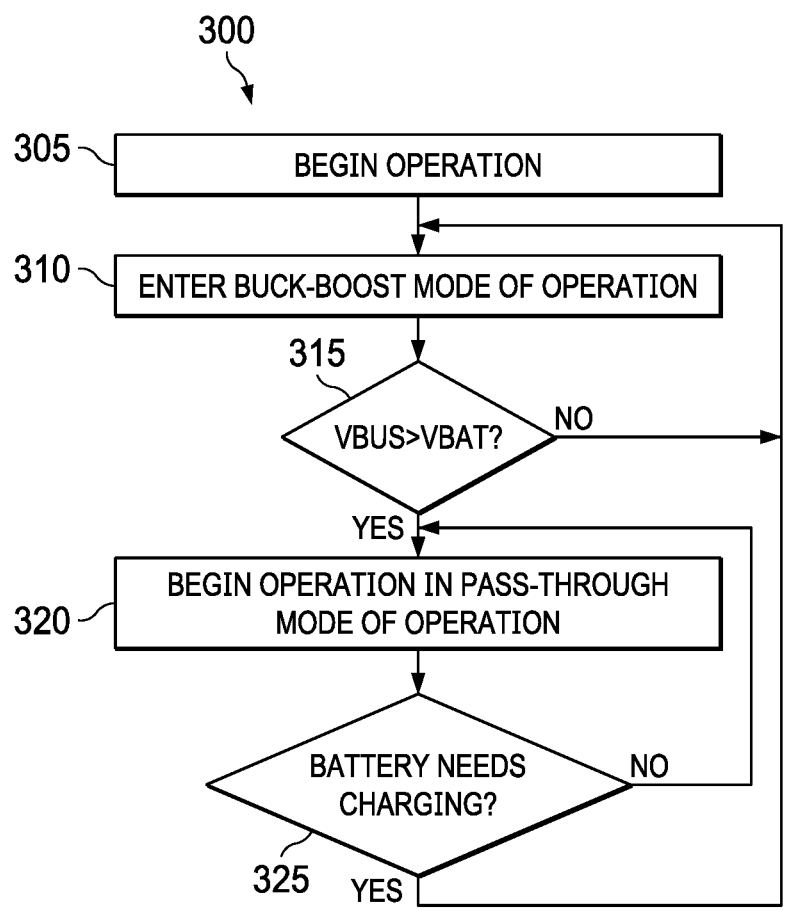
FIG. 3 shows a flowchart of an illustrative method in accordance with various examples.

Turning now to FIG. 3, a flowchart of an illustrative method 300 is shown. In at least some examples, the method 300 is implemented at least partially by a controller, such as the charger controller 202 of the circuit 200 of FIG. 2. The method 300 is implemented by the controller, in some examples, to determine a mode of operation for a charger. The charger is, in some examples, a NVDC including a pass-through mode. The mode of operation is selected from among a buck-boost mode and a pass-through mode, in some examples, while in other examples additional, or alternative, modes of operation are available for selection by the controller.

At operation 305, the controller controls the charger to begin operation. The controller controls the charger to begin operation, for example, based on a value of a power on reset (POR) signal. In other examples, the controller controls the charger to begin operation on power-up (e.g., when a supply voltage is received by the controller), when VBUS is received at a power adapter of the charger, or based on any other suitable condition or determination.

At operation 310, the controller enters a buck-boost mode of operation. While in the buck-boost mode of operation, the charger bucks and/or boosts VBUS to generate VSYS and/or to charge a battery coupled to the charger.

At operation 315, the controller determines whether VBUS is greater in value than VBAT. When VBUS is not greater in value than VBAT, the method 300 returns to the operation 310. When VBUS is greater in value than VBAT, the method 300 proceeds to operation 320.

At operation 320, the controller controls the charger to begin operation in a pass-through mode. While operating in the pass-through mode, VBUS is provided as VSYS minus conduction losses of components of a critical path of the charger between a power adapter at which VBUS is received and a node at which VSYS is provided. In at least some examples, switching losses are not incurred while operating in the pass-through mode.

At operation 325, the controller determines whether a battery coupled to the charger needs charging. Criteria considered for a determination that the battery needs charging varies in implementation, and in at least some examples includes a percentage of a maximum storable energy that remains stored in the battery. When the battery needs charging, the method 300 returns to operation 310. When the battery does not need charging, the method 300 returns to the operation 320.

While the operations of the method 300 have been discussed and labeled with numerical reference, in various examples the method 300 includes additional operations that are not recited herein (e.g., such as intermediary comparisons, logical operations, output selections such as via a multiplexer, etc.), in some examples any one or more of the operations recited herein include one or more sub-operations (e.g., such as intermediary comparisons, logical operations, output selections such as via a multiplexer, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

Figure 4:
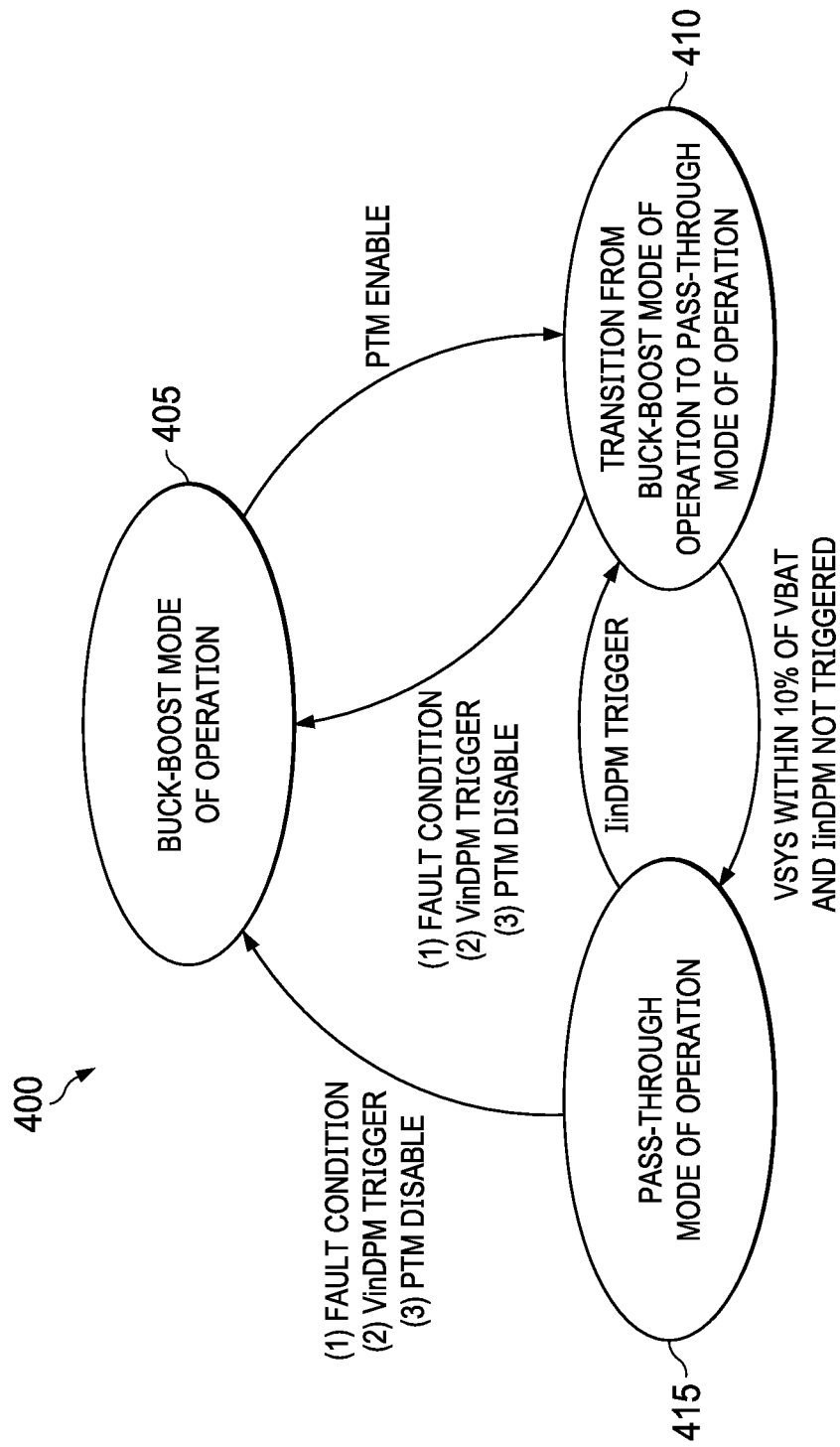
FIG. 4 shows a state diagram in accordance with various examples.

Turning now to FIG. 4, an illustrative state diagram 400 is shown. In at least some examples, the state diagram 400 corresponds to determinations and/or actions made or taken by a controller, such as the charger controller 202 of the circuit 200 of FIG. 2. The state diagram 400, in at least some examples, illustrates state conditions for the controller to control a charger transitioning among a buck-boost mode of operation, a transitional phase between modes of operation, and a pass-through mode of operation. The charger is, for example, a NVDC including a pass-through mode.

At state 405, the controller is controlling, or has controlled, the charger to operate in the buck-boost mode of operation. While in the buck-boost mode of operation, the charger performs buck and/or boost power conversion to generate VSYS and/or charge a battery coupled to the charger. Based on one or more signals received by the controller, or one or more determinations made by the controller based on monitored or received values, and when VBUS is greater in value than VBAT (or in the case of fast charging, approximately equal in value to VBAT), the controller controls the charger to transition to state 410. Also while operating in the buck-boost mode, monitoring and/or fault protection for the circuit is performed.

At state 410, the controller controls the charger to operate in a transitional phase, transitioning from the buck-boost mode to the pass-through mode. During the transitional phase, the controller controls the charger to change a regulation point of the buck-boost mode of operation from approximately equal to VBAT to approximately equal to VBUS. When VSYS is approximately equal in value to VBUS (e.g., when VSYS is within about 10% of VBUS) and IIN is less than IinDPM, the controller controls the charger to transition to state 415. Also while operating in the pass-through mode, monitoring and/or fault protection for the circuit is performed. For example, when the controller determines that a fault condition has occurred, the controller controls the charger to transition to state 405. The fault conditions include, for example, over voltage, under voltage, over current, under current, and/or over temperature faults. Similarly, when the controller determines that VBUS is less the VinDPM, the controller controls the charger to transition to the state 405. Additionally, based on one or more signals received by the controller, or one or more determinations made by the controller based on monitored or received values, such as when VBUS is less in value than VBAT, the controller controls the charger to transition to state 405.

At state 415, the controller controls the charger to operate in the pass-through mode. While operating in the pass-through mode, power conversion along a critical path between a power adapter of the charger and a node at which VSYS is provided by the charger is disabled. Also while operating in the pass-through mode, monitoring and/or fault protection for the circuit is performed. For example, when the charger determines that IIN has exceeded IinDPM, the controller controls the charger to transition back to state 410. When the controller determines that a fault condition has occurred, the controller controls the charger to transition to state 405. The fault conditions include, for example, over voltage, under voltage, over current, under current, and/or over temperature faults. Similarly, when the controller determines that VBUS is less than VinDPM, the controller controls the charger to transition to the state 405. Additionally, based on one or more signals received by the controller, or one or more determinations made by the controller based on monitored or received values, such as when VBUS is less in value than VBAT, the controller controls the charger to transition to state 405.

In some examples, the state machine 400 is implemented by one or more components capable of performing processing. The components may be any combination of analog and/or digital components that are capable of receiving inputs, making decisions or determinations regarding the inputs and/or pre-programmed criteria, and generating outputs, including control signals, based on the received inputs and decisions or determinations. For example, these components include logic structures or circuits (e.g., analog components coupled in a configuration that enables them to perform logical operations and/or digital logic gates), a processor, a micro-processor, etc. In at least one example, the charger controller 202 includes such components capable of performing processing and implements the state machine 400 by executing the code shown in the table of FIG. 5. In various examples, the charger controller 202 executes other code in addition to the code shown in the table of FIG. 5. By executing the code shown in the table of FIG. 5, the charger controller 202 implements the state machine 400 to control operation of the circuit 200. For example, based on input signals received by the charger controller 202 and the code shown in the table of FIG. 5 that programmatically defines the state machine 400, the charger controller 202 makes determinations to output one or more control signals, such as for controlling conductive states of the transistors 210, 212, 216, 218, and 220 to operate the circuit 200 in a pass-through mode of operation or a buck-boost mode of operation, as discussed in greater detail elsewhere herein.

Turning now to FIG. 6, a flowchart of an illustrative method 600 is shown. In at least some examples, the method 600 is implemented at least partially by a controller, such as the charger controller 202 of the circuit 200 of FIG. 2. The method 600 is implemented by the controller, in some examples, to control a multi-channel charger. For example, the multi-channel charger may implement a plurality of chargers for generating VSYS and/or charging a battery.

At operation 605, the controller controls the multi-channel charger to begin operation. The controller controls the multi-channel charger to begin operation, for example, based on a value of a POR signal. In other examples, the controller controls the multi-channel charger to begin operation on power-up (e.g., when a supply voltage is received by the controller), when VBUS is received at a power adapter of the multi-channel charger, or based on any other suitable condition or determination.

At operation 610, the controller controls the multi-channel charger to operate both a first channel (or first charger) and a second channel (or charger) in a buck-boost mode of operation. While operating both the first channel and the second channel in the buck-boost mode of operation, the first channel generates and/or provides VSYS and the second channel charges a battery coupled to the multi-channel charger. In at least some examples, the first channel further charges the battery while operating in the buck-boost mode. In at least some examples, charging the battery using both the first channel and the second channel approximately doubles a charging rate of the battery.

At operation 615, the controller determines whether VBUS is greater in value than VBAT. When VBUS is not greater in value than VBAT, the method 600 returns to the operation 610. When VBUS is greater in value than VBAT, the method 600 proceeds to operation 620.

At operation 620, the controller determines whether a system or component receiving VSYS is under heavy load. In at least some examples, the existence of a heavy load is determined according to a temperature of the charger. For example, when the system or component receiving VSYS is under heavy load the charger will radiate more heat, leading to a higher temperature, than when the system or component receiving VSYS is not under heavy load. When the controller determines that the system receiving VSYS is not under heavy load, the method 600 returns to the operation 610. When the controller determines that the system receiving VSYS is under heavy load, the method 600 continues to operation 625.

At operation 625, the controller controls the multi-channel charger to operate the first channel in the pass-through mode while continuing to operate the second channel in the buck-boost mode. While operating the first channel in the pass-through mode and the second channel in the buck-boost mode, the first channel generates and/or provides VSYS and the second channel charges the battery coupled to the multi-channel charger.

While the operations of the method 600 have been discussed and labeled with numerical reference, in various examples the method 600 includes additional operations that are not recited herein (e.g., such as intermediary comparisons, logical operations, output selections such as via a multiplexer, etc.), in some examples any one or more of the operations recited herein include one or more sub-operations (e.g., such as intermediary comparisons, logical operations, output selections such as via a multiplexer, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

Figure 7:
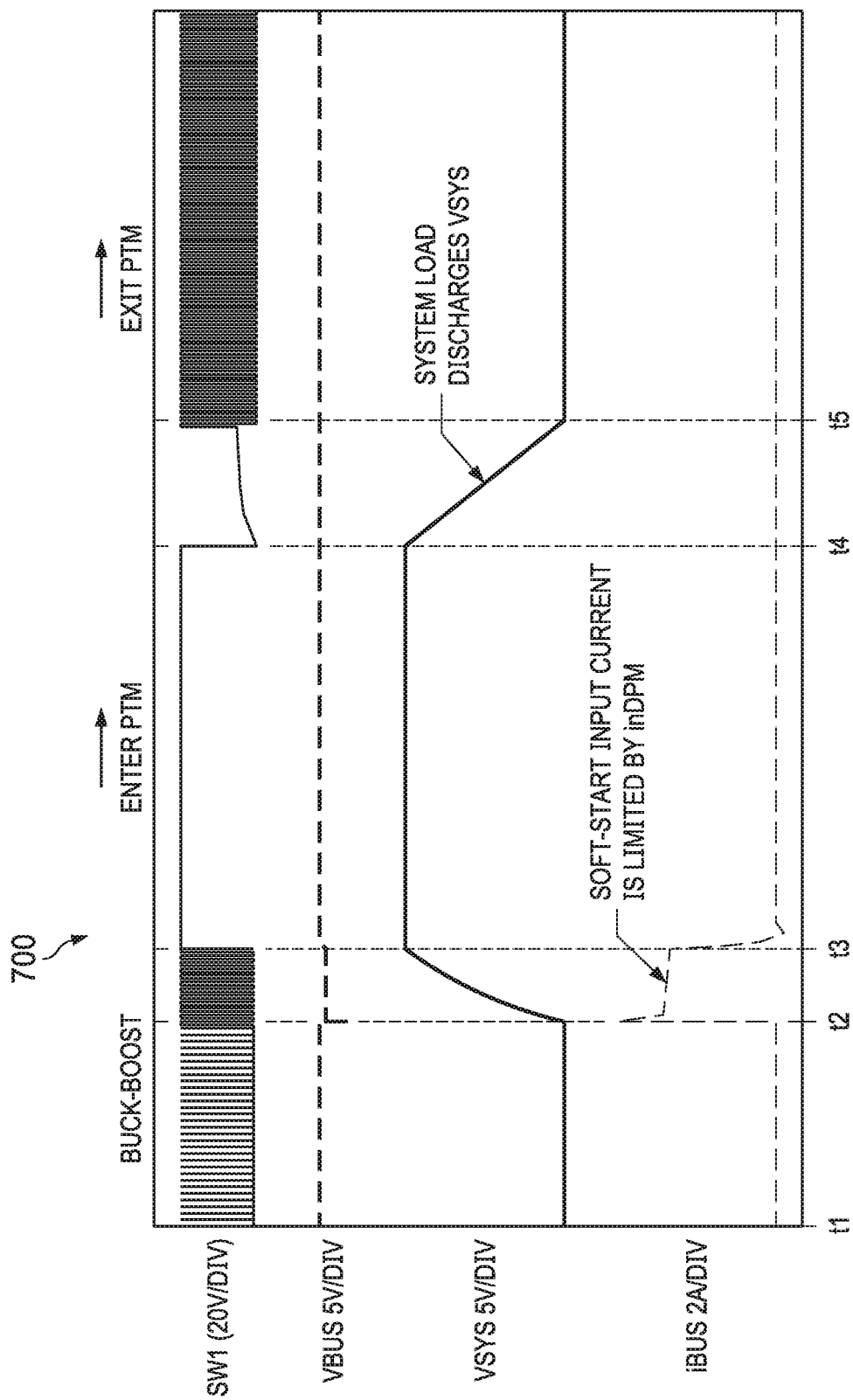
FIG. 7 shows a diagram of illustrative signals in accordance with various examples.

Turning now to FIG. 7, a diagram 700 of illustrative signal waveforms is shown. In at least some examples, the diagram 700 is illustrative of at least some waveforms present in a circuit such as the circuit 200 of FIG. 2. As shown in the diagram 700, at time t1, the circuit begins operating in a buck-boost mode of operation. At a time t2, the circuit begins a transition from the buck-boost mode of operation to a pass-through mode of operation. While transitioning from the buck-boost mode of operation to the pass-through mode of operation, the circuit modes a regulation point of the buck-boost mode of operation to approximately equal VBUS, causing a value of VSYS to rise to approximately a value of VBUS. At a time t3, when VSYS is approximately equal to VBUS, the circuit enters the pass-through mode and ceases performing power conversion (e.g., switching, as shown by a switch control signal SW1). A period of time between t2 and t3 is, in some examples, referred to as a soft start period for the pass-through mode of operation. At a time t4, the circuit exits the pass-through mode of operation and enters the buck-boost mode of operation. However, the circuit does not begin performing switching until VSYS has discharged from having a value approximately equal to VBUS to having a value approximately equal to VBAT, or another regulation point of the buck-boost mode of operation. At a time t5 at which VSYS has discharged to approximately VBAT, the circuit begins switching and performing power conversion to maintain VSYS at the value approximately equal to VSYS. A period of time between t4 and t5 is, in some examples, referred to as a soft start period for the buck-boost mode of operation.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors capacitors and/or inductors), and/or one or more sources (such as voltage and/or current sources) may instead include only the semiconductor elements within a single physical device (e.g., a semiconductor die and/or integrated circuit (C) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., field effect transistor (FET), metal oxide semiconductor FET (MOSFET), n-type, p-type, etc.), these components may be exchanged for components of other process technologies (e.g., replace FET and/or MOSFET with bi-polar junction transistor (BST), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "around voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
    a first transistor having a drain terminal coupled to a first node, a source terminal coupled to a second node, and a gate terminal, the first node is adapted to be coupled to a voltage supply operable to supply a bus voltage;
    a second transistor having a source terminal coupled to a third node, a drain terminal coupled to a fourth node, and a gate terminal, the fourth node is adapted to be coupled to a load;
    a third transistor having a drain terminal coupled to the second node, a source terminal coupled to a ground node, and a gate terminal; and
    a fourth transistor having a drain terminal coupled to the third node, a source terminal coupled to the ground node, and a gate terminal;
    a fifth transistor having a drain terminal coupled to the fourth node, a source terminal coupled to a sixth node, and a gate terminal, the sixth node is adapted to be coupled to a battery, and
    a controller coupled to the gate terminal of the first transistor, the second transistor, the third transistor, the fourth transistor and the fifth transistor, wherein the controller is configured to:
        turn on the first and second transistors while turning off the third, fourth and fifth transistors during first operational circumstances; and
        control the first, second, third, fourth and fifth transistors to operate as components of a buck-boost power converter under second operational circumstances to generate a system voltage present at the fourth node based on the bus voltage, the system voltage having a different value as a result of power switching of the first transistor or the second transistor than a value of the bus voltage.

2. The circuit of claim 1,
    wherein the controller further controls the third transistor and the fourth transistor to be in non-conductive states when controlling the first transistor and the second transistor to operate as components of the pass-through path in the circuit, and
    wherein the controller further controls the third transistor and the fourth transistor to operate as components of the buck-boost power converter under the second operational circumstances.

3. The circuit of claim 2, further comprising:
    an inductor having a first terminal coupled to the second node and a second terminal coupled to a third node;
    a first capacitor coupled between a fifth node and the ground node;
    a first resistor coupled between the fifth node and the first node;
    a second capacitor coupled between the first node and the ground node; and
    a third capacitor coupled between the fourth node and the ground node.

4. The circuit of claim 3, wherein the controller has inputs coupled to the first node, the second node, the third node, the fourth node, the fifth node, a sixth node, and a seventh node.

5. The circuit of claim 1, further comprising:
    a second resistor coupled between the sixth node and a seventh node.

6. The circuit of claim 5, wherein the first operational circumstances are the bus voltage being greater in value than a voltage of the battery, and wherein the second operational circumstances are the bus voltage being less in value than the voltage of the battery.

7. The circuit of claim 5, wherein the controller is configured to control the fifth transistor to be in a non-conductive state when controlling the first transistor and the second transistor to operate as components of the pass-through path in the circuit, and wherein the controller is configured to control the fifth transistor to be in a conductive state under the second operational circumstances.

* * * * *